(12) United States Patent
Koponen et al.

(10) Patent No.: US 10,838,141 B2
(45) Date of Patent: Nov. 17, 2020

(54) SPUN ROUND CORE FIBER

(71) Applicant: nLIGHT, Inc., Vancouver, WA (US)

(72) Inventors: Joona Koponen, Vantaa (FI); Changgeng Ye, Espoo (FI); Ossi Kimmelma, Helsinki (FI)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 16/381,836

(22) Filed: Apr. 11, 2019

(65) Prior Publication Data
US 2019/0235160 A1    Aug. 1, 2019

Related U.S. Application Data

(63) Continuation of application No. 15/702,296, filed on Sep. 12, 2017, now Pat. No. 10,261,247, which is a
(Continued)

(51) Int. Cl.
*G02B 6/028*   (2006.01)
*C03B 37/012*   (2006.01)
(Continued)

(52) U.S. Cl.
CPC ...... *G02B 6/0286* (2013.01); *C03B 37/01222* (2013.01); *C03B 37/028* (2013.01); *C03B 37/0253* (2013.01); *C03B 37/02745* (2013.01); *C03B 37/02763* (2013.01); *G02B 6/02* (2013.01); *G02B 6/02009* (2013.01); *G02B 6/02338* (2013.01); *G02B 6/14* (2013.01); *C03B 2203/12* (2013.01); *C03B 2203/20* (2013.01); *C03B 2203/32* (2013.01);
(Continued)

(58) Field of Classification Search
None
See application file for complete search history.

(56) References Cited

U.S. PATENT DOCUMENTS 6,628,874 B1 * 9/2003 Sugawara .......... G02B 6/02042
                                                        385/115
7,809,224 B2   10/2010 Galvanauskas
(Continued)

FOREIGN PATENT DOCUMENTS

CN          103080796 A         1/2013

OTHER PUBLICATIONS

Office Action issued in Chinese Patent Application No. 201580017190. 0, dated Apr. 15, 2019, 3pp.
(Continued)

*Primary Examiner* — Tina M Wong
(74) *Attorney, Agent, or Firm* — Klarquist Sparkman, LLP

(57) ABSTRACT

Optical waveguide cores having refractive index profiles that vary angularly about a propagation axis of the core can provide single-mode operation with larger core diameters than conventional waveguides. In one representative embodiment, an optical waveguide comprises a core that extends along a propagation axis and has a refractive index profile that varies angularly about the propagation axis. The optical waveguide can also comprise a cladding disposed about the core and extending along the propagation axis. The refractive index profile of the core can vary angularly along a length of the propagation axis.

21 Claims, 10 Drawing Sheets

Related U.S. Application Data continuation of application No. 15/115,392, filed as application No. PCT/US2015/013583 on Jan. 29, 2015, now Pat. No. 9,784,913.

(60) Provisional application No. 61/933,641, filed on Jan. 30, 2014.

(51) Int. Cl.

| | | |
|---|---|---|
| *C03B 37/025* | (2006.01) | |
| *C03B 37/027* | (2006.01) | |
| *C03B 37/028* | (2006.01) | |
| *G02B 6/02* | (2006.01) | |
| *G02B 6/14* | (2006.01) | |

(52) U.S. Cl.
CPC ...... *C03B 2203/34* (2013.01); *C03B 2205/07* (2013.01); *G02B 6/028* (2013.01)

(56) References Cited

U.S. PATENT DOCUMENTS

| | | | |
|---|---|---|---|
| 8,582,609 B2 | 11/2013 | Tong et al. | |
| 8,903,214 B2 | 12/2014 | Alkeskjold | |
| 9,784,913 B2 | 10/2017 | Kopenen | |
| 10,416,366 B2* | 9/2019 | Rose | A61N 5/06 |
| 2004/0197061 A1 | 10/2004 | Ogura | |
| 2007/0201793 A1 | 8/2007 | Askins | |
| 2008/0101754 A1 | 5/2008 | Parker et al. | |
| 2009/0320526 A1* | 12/2009 | Carberry | G01N 21/05 |
| | | | 65/377 |
| 2013/0022060 A1* | 1/2013 | Gaborel | G02B 6/4206 |
| | | | 372/6 |
| 2013/0114129 A1* | 5/2013 | Alkeskjold | C03B 37/0122 |
| | | | 359/341.3 |
| 2013/0291603 A1 | 11/2013 | Guertin et al. | |
| 2014/0268310 A1* | 9/2014 | Ye | G02B 6/02 |
| | | | 359/341.1 |
| 2015/0253499 A1 | 9/2015 | Balemarthy | |
| 2015/0301278 A1* | 10/2015 | Rosenow | C03B 37/01211 |
| | | | 385/123 |
| 2015/0316714 A1* | 11/2015 | Tsuchida | H01S 3/06737 |
| | | | 385/127 |
| 2016/0245989 A1 | 8/2016 | Suzuki | |
| 2016/0266307 A1* | 9/2016 | Hayashi | G02B 6/4413 |
| 2016/0320556 A1* | 11/2016 | Nasilowski | G02B 6/02042 |
| 2017/0010410 A1 | 1/2017 | Koponen | |
| 2018/0011243 A1 | 1/2018 | Koponen | |
| 2019/0235160 A1* | 8/2019 | Koponen | G02B 6/0286 |
| 2019/0235164 A1* | 8/2019 | Triplett | G02B 6/02361 |

OTHER PUBLICATIONS

Clarke, "Temperature stable spun elliptical-core optical-fiber current transducer," *Opt. Lett.* 18, 158-160 (1993).

First Office Action issued in corresponding Chinese Patent Application No. 201580017190.0, dated Jul. 9, 2018, 13 pp.

International Search Report and Written Opinion issued by the ISA/RU on Jun. 4, 2015, for PCT Patent Application No. PCT/US2015/013583, filed Jan. 29, 2015, 7 pp.

Nicholson et al., "Raman fiber laser with 81 W output power at 1480 nm," *Opt. Lett.* 35, 3069-3071, 2010.

Tjugiarto et al., "Couplings in spun twin-core optical fibers," *Opt. Lett.* 17, 1058-1060, 1992.

Wang et al., "Efficient single-mode operation of a cladding-pumped ytterbium-doped helical-core fiber laser," *Opt. Lett.* 31, 226-228, 2006.

* cited by examiner

SPUN ROUND CORE FIBER

CROSS REFERENCE TO RELATED APPLICATIONS

This is a continuation of U.S. patent application Ser. No. 15/702,296, filed Sep. 12, 2017, which is a continuation of U.S. patent application Ser. No. 15/115,392, filed Jul. 29, 2016, now U.S. Pat. No. 9,784,913, which is the U.S. National Stage of International Application No. PCT/US2015/013583, filed Jan. 29, 2015, which was published in English under PCT Article 21(2), which in turn claims the benefit of U.S. Provisional Application No. 61/933,641, filed Jan. 30, 2014, all of which applications are incorporated by reference herein in their entirety.

FIELD

The disclosure pertains to optical fibers configured to discriminate against higher order modes.

BACKGROUND

Power scaling of fiber lasers and amplifiers typically requires large-mode-area (LMA) fibers in order to reduce intensity and avoid non-linear effects. To increase mode area, the core size must typically be enlarged. However, increased mode area and core size is frequently accompanied by the generation and/or transmission of higher order modes, which can significantly reduce the quality of the output beam of the fiber. Thus, single-mode operation of conventional fibers can become impractical as core size increases. Accordingly, improvements to optical fibers are desirable.

SUMMARY

Disclosed embodiments of the present application provide optical waveguides that address certain deficiencies of known optical waveguides. In one representative embodiment, an optical waveguide comprises a core that extends along a propagation axis and has a refractive index profile that varies angularly about the propagation axis. The optical waveguide can also comprise a cladding disposed about the core and extending along the propagation axis. The refractive index profile of the core can also vary angularly along a length of the propagation axis.

In another representative embodiment, a method of making a core rod preform comprises situating one or more silica rods having a first index of refraction in a silica tube, situating one or more silica rods having a second index of refraction in the silica tube, and collapsing the silica tube to form a core rod preform. The core rod preform can have a refractive index profile that varies angularly with respect to a longitudinal axis of the preform.

In another representative embodiment, a method comprises situating a core rod within a cladding tube to obtain an optical fiber preform, the core rod having a refractive index profile that varies angularly about a longitudinal axis of the core rod, and drawing the optical fiber preform to create an optical fiber. The optical fiber preform can be rotated while being drawn such that the refractive index profile of a core of the resultant optical fiber varies angularly along the longitudinal axis of the core.

In another representative embodiment, a method of discriminating against a higher order mode in an optical waveguide comprises directing optical radiation into a core of an optical waveguide, the core having a refractive index profile that varies angularly about a propagation axis, and receiving the optical radiation after propagation in the optical waveguide.

In another representative embodiment, an optical system comprises a seed optical source configured to provide a seed optical beam, one or more optical amplifiers configured to receive and amplify the seed optical beam, and at least one optical pump source configured to provide at least one pump optical beam to a combiner. The combiner can be configured to couple pump optical radiation from the pump optical beam into a cladding of a passive optical fiber. The optical system can further comprise an active optical fiber in communication with the passive optical fiber, and the active optical fiber can be configured to discriminate against higher order modes.

In another representative embodiment, an optical waveguide comprises a core that extends along a propagation axis, and a cladding disposed about the core and extending along the propagation axis. The core can have a refractive index profile that varies angularly about the propagation axis. The cladding can also have a refractive index profile that varies angularly about the propagation axis. The refractive index profiles of the core and the cladding can also vary angularly along the length of the propagation axis.

The foregoing and other objects, features, and advantages of the disclosure will become more apparent from the following detailed description, which proceeds with reference to the accompanying figures.

DETAILED DESCRIPTION

Figure 1:
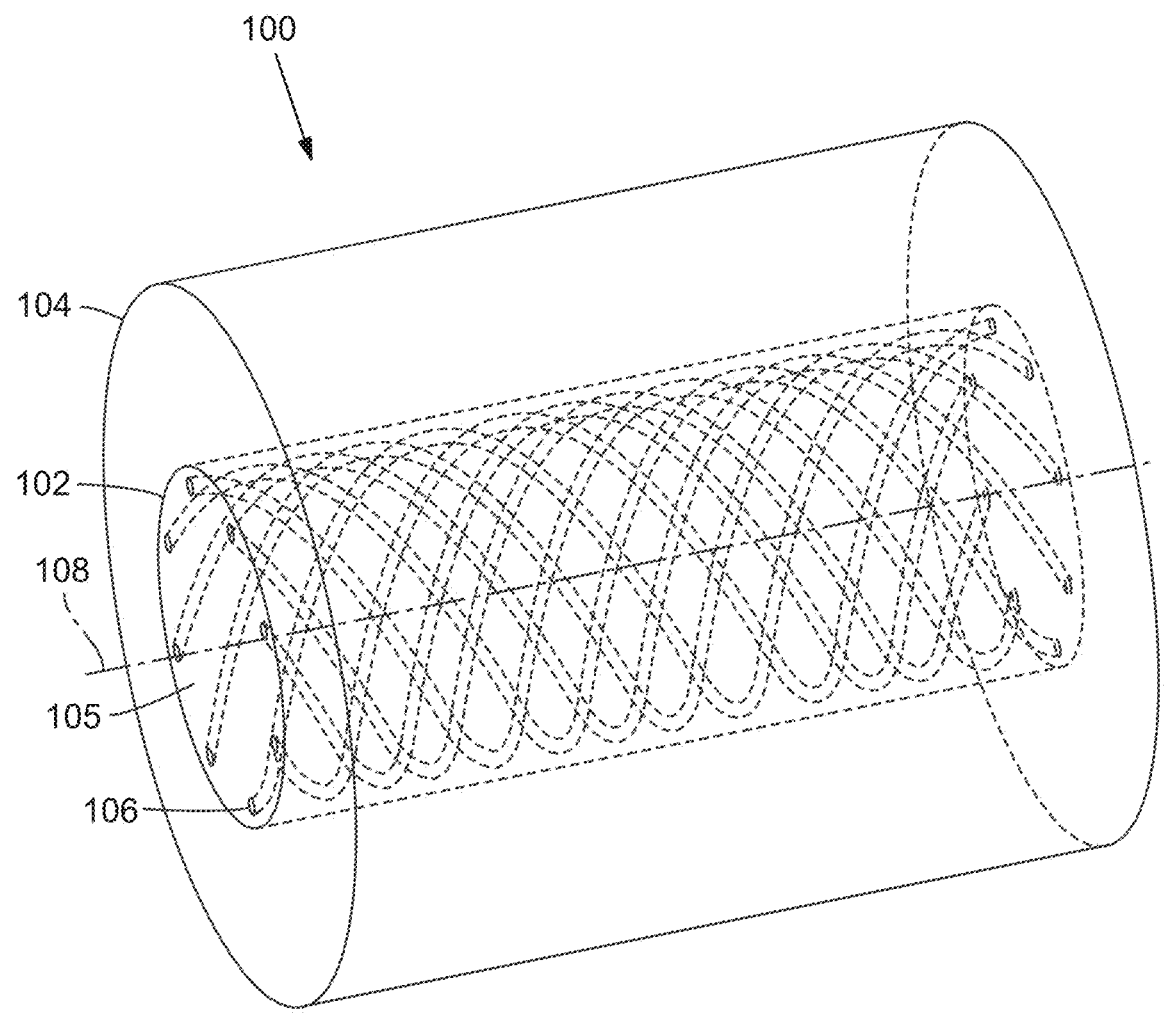
FIG. 1 is a perspective view of an optical waveguide having a plurality of mode-discriminating regions according to one embodiment.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest," "best," "minimum," or the like. It will be appreciated that such descriptions are intended to indicate that a selection among many used functional alternatives can be made, and such selections need not be better, smaller, or otherwise preferable to other selections.

Optical fibers or other optical waveguides are generally based on a variation of refractive index as a function of distance from a propagation axis. Such refractive index variations include so-called index steps such as those associated with typical step index fibers and continuous variations such as those associated with typical gradient index fibers. Many convenient examples are based on optical fibers having circular cross-sections. Such fibers generally include a central core that is surrounded by a cladding region and the core and cladding are selected to provide guided wave propagation. In the examples disclosed below, optical fibers, optical fiber sections, preforms, and waveguide devices are shown as extending along linear axes. It will be appreciated that fibers and preforms can be arranged on curved, segmented, or axes of other configurations. Typically, such devices extend along propagation axes along which optical radiation propagates in the device, and such axes can be linear or curved.

In some embodiments, multimode or single mode devices are described, but by suitable selection of device characteristics such as core and cladding refractive indices (or refractive index difference) and dimensions, multimode or single mode devices can be fabricated. To obtain single mode propagation in a step index waveguide, fiber characteristics are selected so that the so-called V-number $V = \pi NA d_{CORE}/\lambda$ is less than about 2.4, wherein $\lambda$ is a free space wavelength of radiation to be propagated in the device, $d_{CORE}$ is a core diameter, and NA is a device numerical aperture. Device mode field diameters (MFD) can also be selected based on device characteristics, as $MFD = d_{CORE}(0.65 + 1.619/V^{3/2} + 2.879/V^6)$. These relationships are suitable for fiber devices having circular cross-sections, but similar considerations are applicable for other cross-sectional shapes. While considerable variation in fiber dimensions is possible, in typical examples, conventional single mode fibers for use at wavelengths between about 500 nm and 1500 nm have core diameters of between about 3 µm and 20 µm, while conventional multimode fibers have core diameters of between about 10 µm and 500 µm. Propagation characteristics can be based on step index or gradient index designs. For convenient illustration, sectional views of fibers and preforms are provided. While in many useful examples, fiber and preform cross-sections are circular, oval, elliptical, polygonal or other cross-sections can be used. In addition, in some examples, stress rods or other core features can be provided.

The disclosed embodiments generally pertain to fibers that have a single core surrounded by a cladding layer. However, in other examples, so-called double clad fibers can be formed. Double clad fibers generally include a core surrounded by an inner cladding which is in turn surrounded by an outer cladding. Refractive indices and refractive index profiles for these layers can be selected to provide selected waveguide characteristics. In some examples, double clad fibers include an actively doped core that can be configured to support single mode propagation. The active core and the inner cladding can serve to guide pump radiation into the active gain element of the core. Typically the core has a higher refractive index than the inner cladding, and the inner cladding has higher refractive index than the outer cladding. In double clad fibers with actively doped cores, the core and inner cladding can be decentered with respect to each other so as to more efficiently couple pump radiation from the inner cladding into the core, but other configurations of inner clad and core can be used. Active fiber dopants can include rare earth metals such as Er, Yb, Tm, Ho, and Nd, to name a few, and other optically active metals including Bi. Passive fiber dopants can include other metals including Ge and Al, and various other multiple-ion-codoped combinations. Active and passive fiber dopants can have a radial doping concentration distribution that is flat, linear, parabolic, or arbitrary, to name a few. Other fiber types and associated preforms can be made in the same manner, including polarization retaining fibers that generally include stress elements situated in a cladding layer so as to produce birefringence. Polarization retaining fibers can be configured to support linear, circular, elliptical, radial, azimuthal, and/or complex polarization states, or any combination thereof.

Fiber preforms typically comprise concentric cylinders or layers of materials suitable for forming optical waveguides. A central cylinder can serve to define a waveguide core, and layers exterior to the central cylinder can serve to define waveguide cladding layers with generally lower refractive indices than that of the central core-forming portion. In many preform manufacturing methods, one or multiple sleeving processes take place, in which one or more glass tubes are collapsed onto a glass rod, glass tube, or a stack of glass rods and/or tubes. As used herein, a core rod is defined as a core waveguide material shaped so as to be suitable for forming into a waveguide core, and may include one or more surrounding cladding materials.

Representative fiber preforms, core rods, and other components for fiber preforms and fibers, and optical fibers based on such preforms are described below. Preforms can be made by modified chemical vapor deposition (MCVD) or other processes. Typically, a mixture of oxygen, silicon tetrachloride ($SiCl_4$) and materials such as germanium tetrachloride ($GeCl_4$) or rare earth dopants are introduced into a silica glass tube, which is rotated while heated to about 1500-1600 C with a torch. An inner surface of the glass tube is coated, and a layer with higher refractive index is formed which can be drawn into a fiber core. Typically, the glass tube is collapsed by further heating to form a core rod. Other deposition methods such as outside vapor deposition (OVD), direct nanoparticle deposition, or others can be used as well. Core rods can also be made by arranging a plurality of glass tubes or rods inside the lumen of a glass tube, and collapsing the glass tube by heating to form a core rod as part of any of the preform fabrication methods described above.

The disclosed embodiments can be useful for photosensitive fibers, and for fibers with any cladding shape, including circular, elliptical, rectangular, polygonal, D-shaped, or arbitrarily-shaped, to name a few. The disclosed embodiments can be useful for fibers with or without single- or multiple-layer coatings, including acrylate, silicone, polymer, carbon, metal, nanoparticles, or air-clad structures. The disclosed embodiments can also be useful for fibers configured to support single mode or multi-mode operation, for rod-type fibers with short lengths and large cladding sizes, for longitudinally tapered fibers having varied cladding and/or core sizes along the propagation axis of the fiber, and for structures where the drawing and rotation of the waveguide results in a photonic crystal waveguide (e.g., a photonic crystal fiber or large pitch fiber).

In some embodiments, the refractive index profile of the core can vary angularly about the propagation axis of the waveguide. As used herein, the term "refractive index profile" refers to the refractive index distribution in a transverse plane of a waveguide having a radial coordinate and an azimuthal (i.e., angular) coordinate. As used herein, angular variation refers to change in the refractive index profile of a waveguide as a function of the azimuthal coordinate in the transverse plane of the waveguide. The refractive index profile can be angularly symmetric about the propagation axis or asymmetric. The refractive index profile can also vary radially about the propagation axis of the waveguide. In some embodiments, the refractive index profile can vary radially and angularly about the propagation axis of the waveguide. In this manner, the waveguide can be configured to transmit a particular linearly polarized (i.e., LP) mode, such as the fundamental mode $LP_{01}$, while discriminating against the propagation and/or generation of higher order modes such as the $LP_{11}$ mode, the $LP_{21}$ mode, etc. Modal discrimination can also be caused by, for example, absorption and/or attenuation of a particular mode or modes to be discriminated against. The variation of the refractive index of the waveguide across the transverse plane can be stepped or graded. In some embodiments, a graded refractive index profile can be approximated by a series of steps.

In some embodiments, the refractive index profile of the core can vary angularly along a length of the propagation axis. The angular refractive index profile variation can be periodic or aperiodic along the propagation axis. For example, the angular refractive index profile variation can be sinusoidal or otherwise have a fixed spatial frequency. Periodic variation can also include a plurality of variations with different periods, such as a chirped spatial frequency that increases or decreases along the propagation axis. Such variations are referred to herein as quasi-periodic. Aperiodic refractive index profile variations can include variations along the length of the propagation axis that do not have a regular spatial relationship, such as random variations. In the case of an optical waveguide such as a fiber, such angular variation of the refractive index profile along the propagation axis can be created by, for example, rotating the fiber preform during the drawing process.

The refractive index profile of the core can also vary radially along the length of the propagation axis. Such radial variation can be periodic, aperiodic, or quasi-periodic. Radial variation of the refractive index profile along the propagation axis can be created by, for example, radially varying the refractive index profile of the core rod preform during fabrication.

Figure 2:
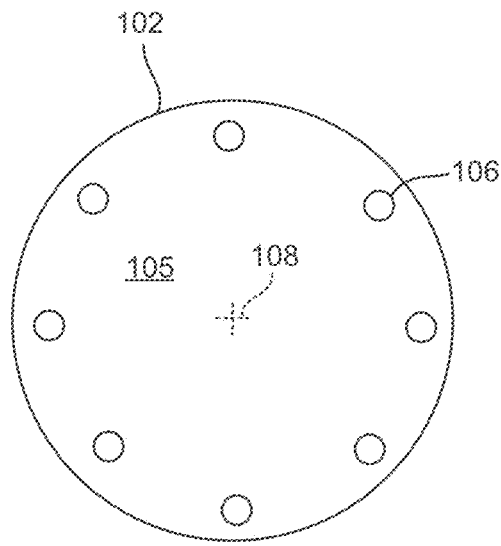
FIG. 2 is a cross-sectional view of the core of the optical waveguide of FIG. 1.

Referring to FIGS. 1 and 2, an optical waveguide 100 comprises a round core 102 and a cladding 104, according to one embodiment. The core 102 can comprise a mode-propagating region 105 and one or more mode-discriminating regions such as representative mode-discriminating region 106 located within the mode-propagating region 105 and situated about a propagation axis 108. In the embodiment shown, the core 102 comprises eight mode-discriminating regions such as mode-discriminating region 106, which can be substantially circular in cross-section and arrayed symmetrically about the propagation axis 108, as best shown in FIG. 2.

In the embodiment shown, the propagation axis 108 is collinear with the longitudinal axis of the waveguide. However, in alternative embodiments, the propagation axis 108 can be located at any desired location within the cross-section of the core 102 to promote, for example, efficient coupling of pump light from the cladding 104 into the core (see, e.g., FIG. 18). In some embodiments, the mode propagating region 105 of the core 102 can have a first index of refraction n1, and the mode-discriminating regions such as mode-discriminating region 106 can have a second index of refraction n2 that is different from the first index of refraction n1. For example, the second index of refraction n2 can be less than the first index of refraction n1. In this manner, the refractive index profile of the core 102 can vary angularly about the propagation axis 108 in a stepped manner. The refractive index profile can also vary radially in a stepped manner. In some embodiments, the second index of refraction n2 can be the same as the refractive index of the cladding 104. In alternative embodiments, the one or more mode-discriminating regions can be light-absorbing, such that modes to be discriminated against are absorbed by the mode-discriminating regions such as mode-discriminating region 106. In further alternative embodiments, the one or more mode-discriminating regions such as mode-discriminating region 106 can have the same or different refractive indices or light absorption characteristics.

In addition to the angular variation of the refractive index profile of the core about the propagation axis 108, the refractive index profile can vary along a length of the propagation axis in a direction generally parallel to a longitudinal axis of the waveguide. For example, as shown in FIG. 1, the mode-discriminating regions such as mode-discriminating region 106 can follow a helical path along the propagation axis 108. In this manner, the refractive index profile of the core can vary angularly along the propagation axis 108. This angular variation of the refractive index profile along the propagation axis 108, together with the angular variation of the refractive index profile about the propagation axis at a given transverse plane of the waveguide, is typically associated with discrimination against or attenuation of higher order modes while allowing transmission of the fundamental mode. In turn, this can allow the optical waveguide 100 to achieve single mode operation with increased core size as compared to conventional optical waveguides by discriminating against unwanted modes while selectively propagating desired modes. The angular variation of the refractive index profile along the length of the propagation axis 108 can be periodic (FIG. 1), aperiodic, or quasi-periodic, depending upon the wavelength of the propagated radiation and the mode(s) to be discriminated against. In alternative embodiments, the waveguide can be configured to discriminate against the fundamental mode.

Figure 3:
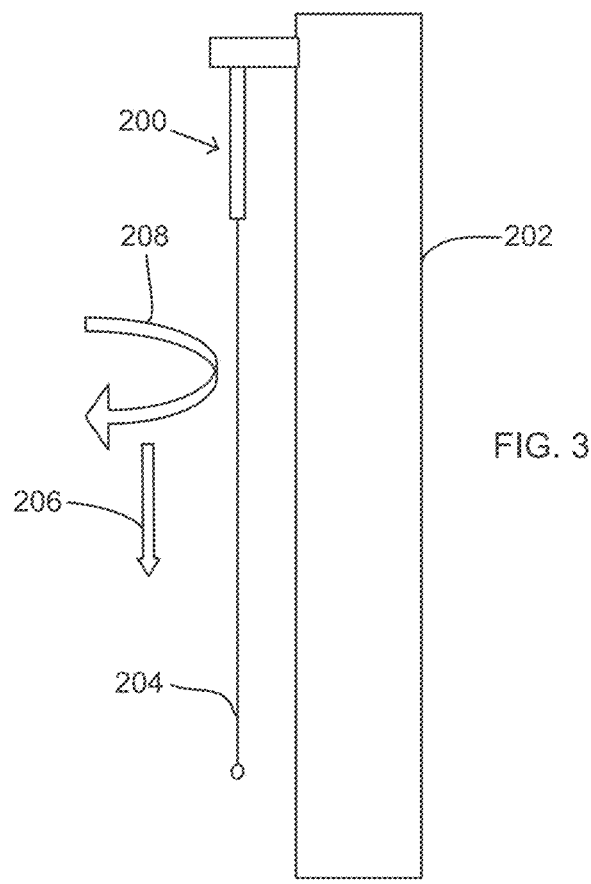
FIG. 3 is a side elevation view of a representative embodiment of a waveguide preform in a draw tower.

Angular variation of the refractive index profile of the core along the propagation axis can be achieved by rotating the waveguide preform during the drawing process. FIG. 3 shows a representative waveguide preform 200 mounted in a draw tower 202. The draw tower 202 can include a furnace (not shown) for heating the preform 200 and causing the material of the preform to be drawn into a thin optical fiber 204 initially by gravity, and later by a capstan (not shown), in the direction indicated by arrow 206 and according to a predetermined feed rate. During the drawing process, the preform 200 can be rotated at a predetermined rate and according to a predetermined rotational sequence or pattern, generally indicated by arrow 208 and further described below. In this manner, the refractive index profile of the core of the resultant optical waveguide can vary angularly along a propagation axis of the core. The rotational sequence or pattern can comprise any rotation or series of rotations, and can be periodic, aperiodic, or quasi-periodic along the propagation axis of the core.

In some embodiments, the mode-propagating region 105 and the one or more mode-discriminating regions such as the mode-discriminating region 106 can be fabricated from, for example, glass, silica, heavy metal fluoride glasses such as ZBLAN, or any of various polymers including polymethyl methacrylate and polystyrene. The mode-propagating region 105 and the mode-discriminating regions such as mode-discriminating region 106 can be fabricated from different materials, or from the same material having different indices of refraction (e.g., resulting from different amounts or types of dopants). In some embodiments, the mode-discriminating regions such as mode-discriminating region 106 can define respective volumes, which can contain gases (e.g., air), or which can be evacuated.

In some embodiments, the diameter of the core 102 can be from about 1 μm to about 500 μm while maintaining single mode operation. In some embodiments, the diameter of the core 102 can be from about 2 μm to about 250 μm while maintaining single mode operation. In some embodiments, the diameter of the core 102 can be from about 5 μm to about 250 μm while maintaining single mode operation. In some embodiments, the diameter of the core 102 can be from about 5 μm to about 100 μm while maintaining single mode operation. In some embodiments, the diameter of the core 102 can be from about 10 μm to about 25 μm while maintaining single mode operation. In some embodiments, the diameter of the core 102 can be from about 10 μm to about 2000 μm while maintaining single mode operation.

In some embodiments, the diameter of the one or more mode-discriminating regions such as the mode-discriminating region 106 can be from less than 1 μm to about 10 μm. In some embodiments, the diameter of the core 102 can be about 60 μm, and the diameter of the mode-discriminating regions such as mode-discriminating region 106 can be about 2 μm. In embodiments comprising more than one mode-discriminating region such as the mode-discriminating region 106, each mode-discriminating region can have a uniform diameter or different diameters (or shapes) depending upon the application of the waveguide and the modes to be discriminated against.

In some embodiments, the optical waveguide 100 can be configured to exhibit losses of from about 0.01 dB/m to about 1 dB/m for the $LP_{01}$ mode. In some embodiments, the optical waveguide 100 can be configured to exhibit losses of about 0.2 dB/m or less for the $LP_{01}$ mode. In some embodiments, the optical waveguide 100 can be configured to exhibit losses of from about 10 dB/m to about 100 dB/m for the $LP_{11}$ mode. In some embodiments, the optical waveguide 100 can be configured to exhibit losses of about 20 dB/m for the $LP_{11}$ mode.

In some embodiments, the optical waveguide can be configured to exhibit relatively higher losses for the $LP_{01}$ mode, while exhibiting relatively lower losses for the $LP_{11}$ mode or other higher order modes. This feature may be preferential in applications that generate, select, filter, or take advantage of the properties of higher order modes, such as the larger mode area of higher order modes. Such applications can include, for example, cylindrical vector beams using higher order modes, or the use of optical modes for carrying optical angular momentum.

Figure 4:
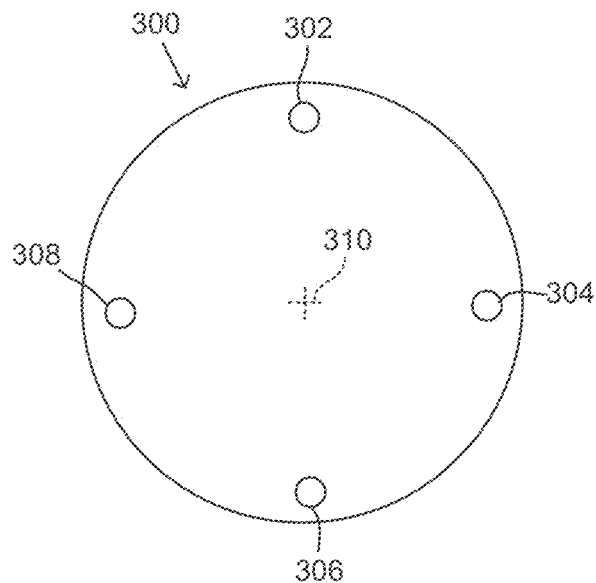
FIG. 4 is a cross-sectional view of another embodiment of a waveguide core.

FIGS. 4-10 show various alternative embodiments of cores of optical waveguides. The number and location of mode-discriminating regions can be varied according to the particular application of the waveguide. For example, a core 300 can have four mode-discriminating regions 302, 304, 306, 308 arranged symmetrically about a propagation axis 310 of the core 300, as shown in FIG. 4. In this manner, the core 300 can have a refractive index profile that varies angularly with respect to the propagation axis 310 of the waveguide. The refractive index profile of the core 300 can also vary radially about the propagation axis 310, and can be angularly and/or radially symmetric about the propagation axis.

Figure 5:
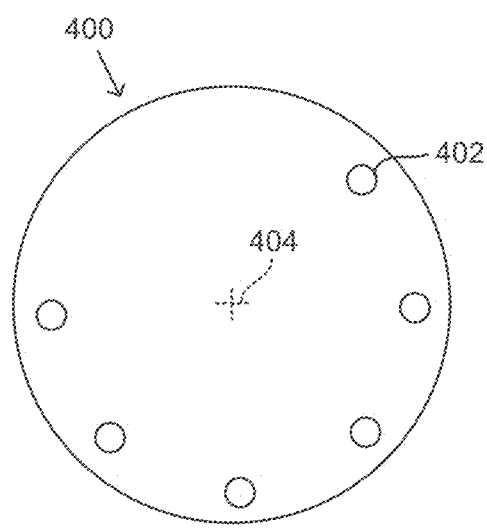
FIG. 5 is a cross-sectional view of another embodiment of a waveguide core.

Alternatively, the arrangement of the mode-discriminating regions need not be symmetrical about the propagation axis. For example, as shown in FIG. 5, a core 400 can comprise a plurality of mode-discriminating regions such as representative mode-discriminating region 402 arranged in an angularly asymmetric manner about a propagation axis 404, which can be located a uniform radial distance from the propagation axis 404.

Figure 6:
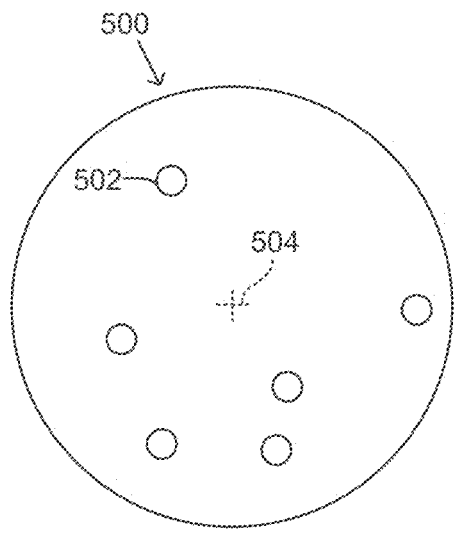
FIG. 6 is a cross-sectional view of another embodiment of a waveguide core.
Figure 7:
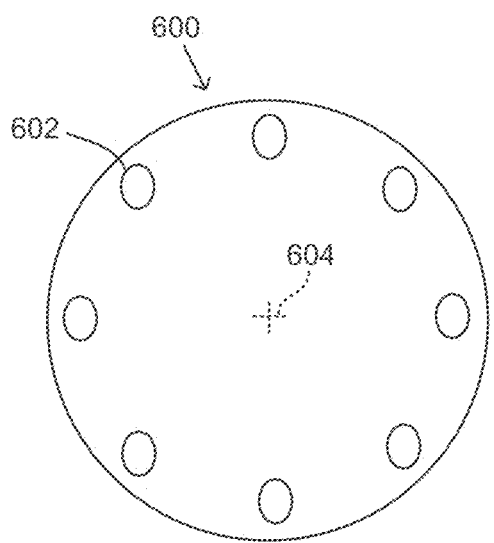
FIG. 7 is a cross-sectional view of another embodiment of a waveguide core having one or more elliptically-shaped mode-discriminating regions.
Figure 8:
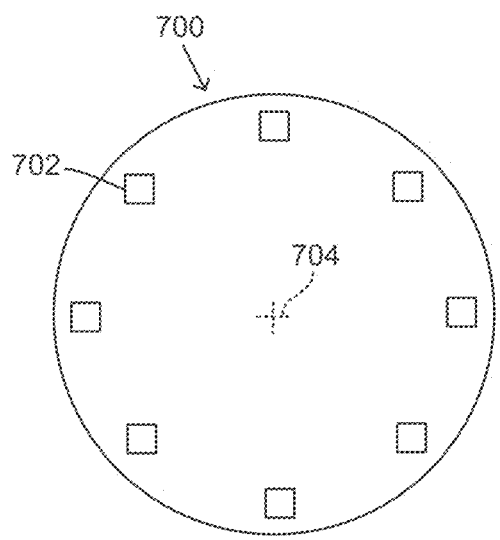
FIG. 8 is a cross-sectional view of another embodiment of a waveguide core having one or more rectangular mode-discriminating regions.
Figure 9:
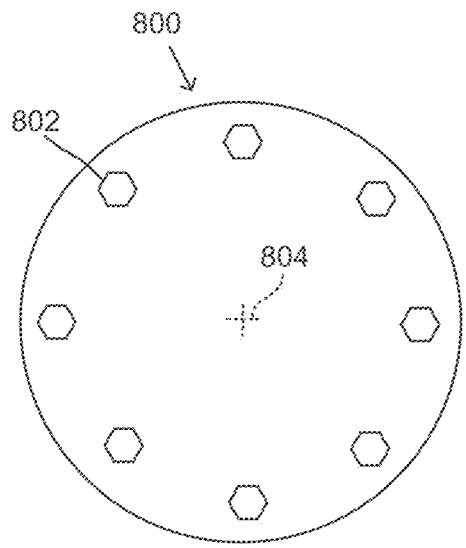
FIG. 9 is a cross-sectional view of another embodiment of a waveguide core having one or more hexagonally-shaped mode-discriminating regions.
Figure 10:
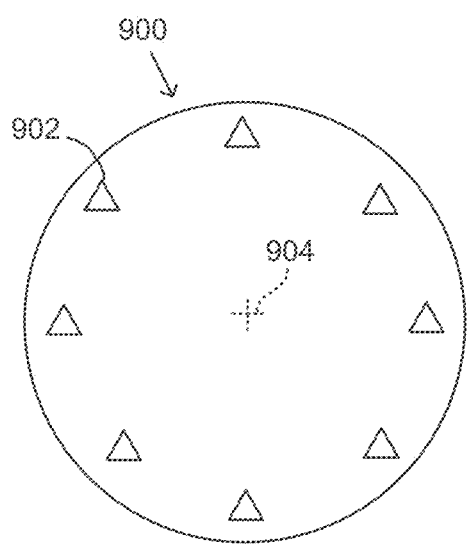
FIG. 10 is a cross-sectional view of another embodiment of a waveguide core having one or more triangularly-shaped mode-discriminating regions.

In another embodiment, a core 500 can include a plurality of mode-discriminating regions such as representative mode-discriminating region 502 arranged in an angularly and radially asymmetric manner, as shown in FIG. 6. In this manner, the core 500 can have a refractive index profile that varies angularly about a propagation axis 504 of the core 500. The refractive index profile can also vary radially with respect to the propagation axis 504.

In further alternative embodiments, the one or more mode-discriminating regions need not have a circular cross-section. For example, referring to FIG. 7, a core 600 can comprise a plurality of mode-discriminating regions such as representative mode-discriminating region 602 having elliptical cross-sections and being arranged about a propagation axis 604. In another alternative embodiment shown in FIG. 8, a core 700 can comprise a plurality of mode-discriminating regions such as representative mode-discriminating region 702 having rectangular cross-sections and being arranged about a propagation axis 704. In another alternative embodiment shown in FIG. 9, a core 800 can comprise a plurality of mode-discriminating regions such as representative mode-discriminating region 802 having hexagonally-shaped cross-sections and being arranged about a propagation axis 804. In yet another alternative embodiment shown in FIG. 10, a core 900 can comprise a plurality of mode-discriminating regions such as representative mode-discriminating region 902 having triangular cross-sections and being arranged about a propagation axis 904. Mode-discriminating regions having any of the disclosed cross-sectional shapes can be arranged in any of the radially and/or angularly symmetric or asymmetric configurations described above such that the refractive index profile of the core varies angularly about the propagation axis.

Figure 11:
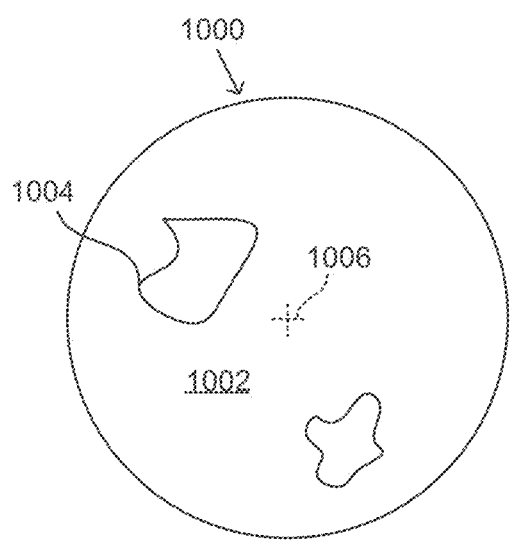
FIG. 11 is a cross-sectional view of another embodiment of a waveguide core having one or more irregularly-shaped mode-discriminating regions surrounded by a mode-propagating region.
Figure 12:
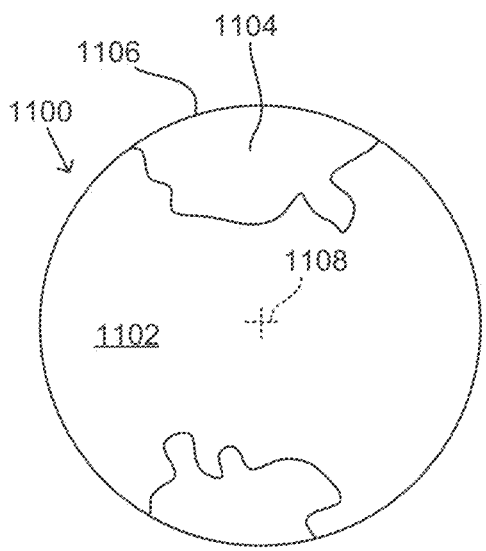
FIG. 12 is a cross-sectional view of an embodiment of a waveguide core having one or more irregularly-shaped mode-discriminating regions partially surrounded by a mode-propagating region.
Figure 13:
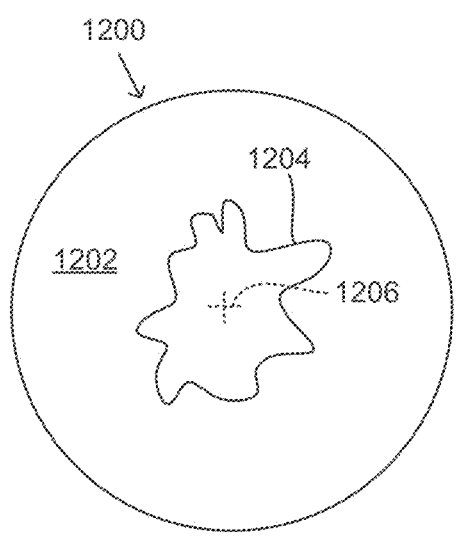
FIG. 13 is a cross-sectional view of another embodiment of a waveguide core having an irregularly-shaped mode-discriminating region located coaxially with a propagation axis of the core.

In further alternative embodiments, the mode-discriminating regions can be irregularly shaped, as shown in FIGS. 11-13. Referring to FIG. 11, a core 1000 can comprise a mode-propagating region 1002 and one or more irregularly-shaped mode-discriminating regions such as representative mode-discriminating region 1004. The one or more irregularly-shaped mode-discriminating regions such as mode-discriminating region 1004 can be surrounded by the mode propagating region 1002 such that the core 1000 maintains a round cross-sectional shape. The one or more irregularly-shaped mode-discriminating regions such as mode-discriminating region 1004 can be located at any radial distance from a propagation axis 1006, as desired.

Alternatively, FIG. 12 shows a core 1100 comprising a mode-propagating region 1102 having a propagation axis 1108. The core 1100 can further comprise one or more irregularly-shaped mode-discriminating regions such as representative mode-discriminating region 1104, which can be only partially surrounded by the mode-propagating region 1102. In the embodiment shown, an exterior boundary 1106 of the mode-discriminating region 1104 can be rounded, such that the core 1100 maintains a round cross-sectional shape. In alternative embodiments, the one or more mode-discriminating regions such as mode-discriminating region 1104 need not be irregularly-shaped, but can have any suitable cross-sectional shape (e.g., polygonal, round, etc.) while maintaining a rounded exterior boundary 1106 such that the core 1100 can have a round cross-sectional shape.

In another alternative embodiment, a core 1200 can comprise a single irregularly-shaped mode-discriminating region 1204 located substantially coaxially with a propagation axis 1206 of the core 1200 and surrounded by a mode-propagating region 1202, as shown in FIG. 13. In this manner, the refractive index profile of the core 1200 can vary angularly and radially about the propagation axis 1206. In alternative embodiments, the mode-discriminating region 1204 can have any suitable shape cross-sectional shape, such as a polygonal cross-sectional shape. In further alternative embodiments, the mode-discriminating region 1204 can surround the mode-propagating region 1202, as further described with respect to FIG. 17.

Figure 14:
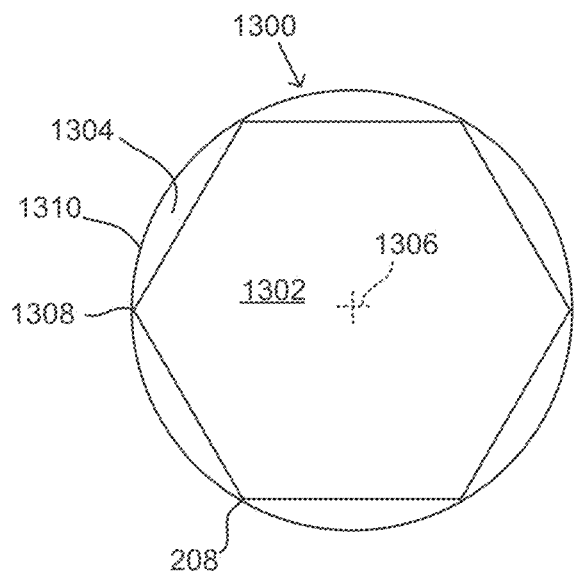
FIG. 14 is a cross-sectional view of another embodiment of a waveguide core having a hexagonally-shaped mode-propagating region.

Referring now to FIG. 14, there is shown another embodiment of an optical waveguide core 1300 having a mode-propagating region 1302 and a plurality of mode-discriminating regions such as representative mode-discriminating region 1304 arranged about a propagation axis 1306. The mode-propagating region 1302 can comprise a hexagonally-shaped cross-section circumscribed within an exterior boundary 1310 of the core 1300 such that the core maintains a round cross-section. The mode-propagating region 1302 can comprise a plurality of vertices such as representative vertex 1308, which can be defined by the intersection of two adjacent facets (i.e., planar surfaces) of the mode-propagating region's cross-sectional shape. Thus, the hexagonally-shaped cross-section of the mode-propagating region 1302 of FIG. 14 can comprise six vertices.

In the embodiment shown, the mode-propagating region 1302 can be configured such that the vertices such as vertex 1308 are substantially coincident with an exterior boundary 1310 of the core 1300. In this manner, the mode-discriminating regions such as mode-discriminating region 1304 can be defined by the area between adjacent vertices of the mode-propagating region 1302 such as the vertex 1308, and the exterior boundary 1310 of the core 1300. The mode propagating region 1302 and the mode-discriminating regions such as mode-discriminating region 1304 can comprise materials having different indices of refraction, as described above. In this manner, the refractive index profile of the core can vary angularly and radially about the propagation axis 1306. The refractive index profile can also be angularly and radially symmetric about the propagation axis 1306. In alternative embodiments, the cross-sectional shape of the mode-propagating region 1302 can be configured such that the refractive index profile is angularly and/or radially asymmetric about the propagation axis 1306. The refractive index profile can also vary angularly along a length of the propagation axis 1306, as described above with respect to the embodiment of FIG. 1.

Figure 15:
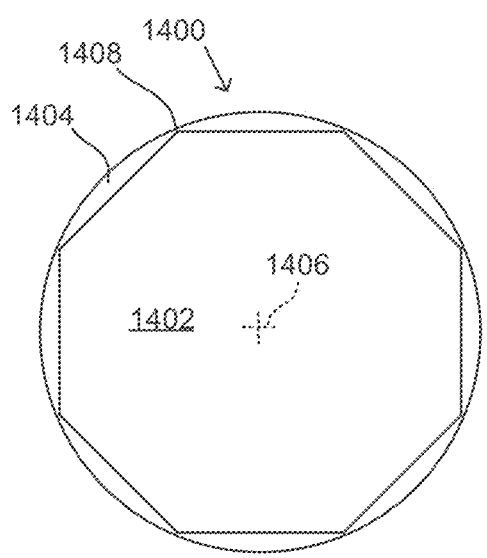
FIG. 15 is a cross-sectional view of another embodiment of a waveguide core having an octagonally-shaped mode-propagating region.

In alternative embodiments, the mode-propagating region 1302 of FIG. 14 can comprise any suitable shape. For example, FIG. 15 shows a core 1400 comprising a mode-propagating region 1402 having an octagonally-shaped cross-section. Vertices of the mode-propagating region 1402 such as representative vertex 1408 can define eight mode-discriminating regions, such as representative mode-discriminating region 1404, arranged about a propagation axis 1406. In this manner, the refractive index profile of the core 1400 can vary angularly and radially about the propagation axis 1406. The refractive index profile can also be angularly and radially symmetric about the propagation axis 1406.

Figure 16:
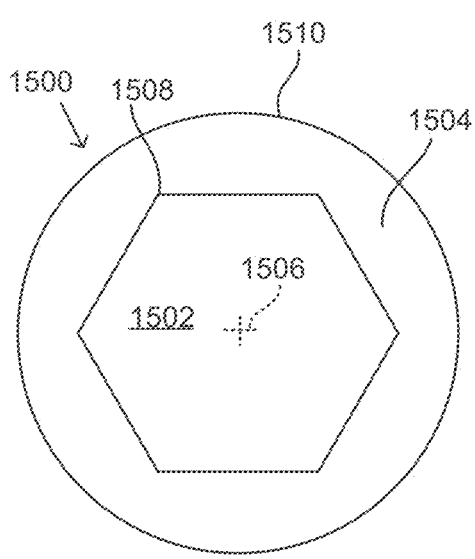
FIG. 16 is a cross-sectional view of another embodiment of a waveguide core having a hexagonally-shaped mode-propagating region.

Referring to FIG. 16, there is shown another embodiment of an optical waveguide core 1500 having a mode-propagating region 1502 and a mode-discriminating region 1504. The mode-propagating region 1502 can have a non-circular cross-section, such as the hexagonally-shaped cross-section shown in FIG. 16, and can be centered about a propagation axis 1506. In the embodiment shown, the mode-propagating region 1502 can comprise six vertices such as representative vertex 1508, corresponding to the hexagonally-shaped cross-section of the mode-propagating region 1502. The mode-propagating region 1502 can be configured such that the vertices such as representative vertex 1508 are located radially inward of an exterior boundary 1510 of the core 1500. Thus, the mode-discriminating region 1504 can continuously surround the mode-propagating region 1502, and can have a round cross-section such that the core 1500 retains a round cross-sectional shape.

The mode-propagating region 1502 can be made from a material having a first index of refraction, and the mode-discriminating region 1504 can be made from a material having a second index of refraction that is different from the first index of refraction, as described above. In this manner, the refractive index profile of the core 1500 can vary angularly and radially about a propagation axis 1506 of the core. The refractive index profile can also be angularly and radially symmetric about the propagation axis 1506. The refractive index profile can also vary angularly along a length of the propagation axis 1506, as described above with respect to the embodiment of FIG. 1.

Figure 17:
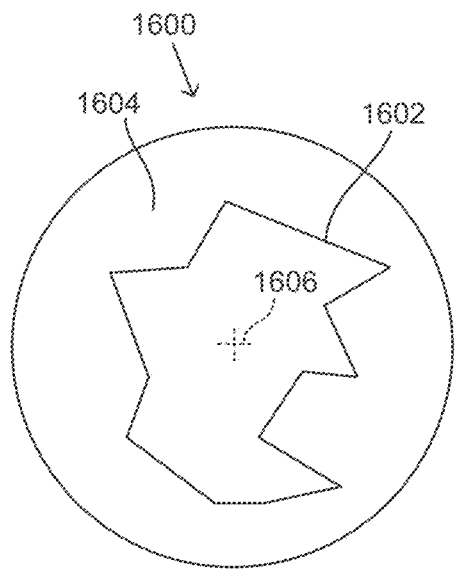
FIG. 17 is a cross-sectional view of another embodiment of a waveguide core having an arbitrarily polygonally-shaped mode-discriminating region.

In alternative embodiments, the cross-sectional shape of the mode-propagating region 1502 can be configured such that the refractive index profile is angularly and/or radially asymmetric about the propagation axis 1506. For example, FIG. 17 shows a core 1600 having a mode-propagating region 1602 with an arbitrarily-shaped polygonal cross-section. The mode-propagating region 1602 can be centered about a propagation axis 1606, and can be surrounded by a round mode-discriminating region 1604 such that the core 1600 can maintain a round cross-section. In this manner, the refractive index profile of the core 1600 can vary angularly and radially about the propagation axis 1606, and can be angularly and radially asymmetric about the propagation axis 1606. The cores of FIGS. 14, 15, 16, and 17 can be obtained by, for example, machining the material of the mode-propagating regions to obtain the desired shape of the mode-propagating regions, followed by one or more sleeving or deposition stages to obtain the respective mode-discriminating regions.

Figure 18:
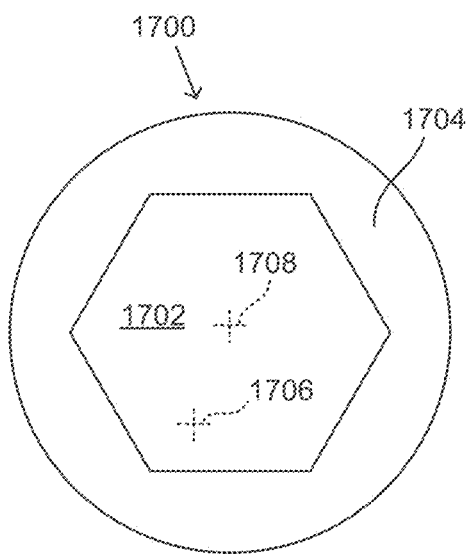
FIG. 18 is a cross-sectional view of another embodiment of a waveguide core having a propagation axis that is radially offset form a longitudinal axis of the core.

Referring to FIG. 18, an alternative embodiment of a core 1700 can comprise a mode-propagating region 1702 and a mode-discriminating region 1704. The mode-propagating region 1702 can have a non-circular cross-section, such as the hexagonally-shaped cross-section of the embodiment shown in FIG. 16. The mode-propagating region 1702 can also have a propagation axis 1706 that is radially offset from a longitudinal axis 1708 of the mode-propagating region. In this manner, the refractive index profile of the core 1700 can vary angularly and radially about the propagation axis 1706 of the core 1700. Propagation axes radially offset from the longitudinal axis of the core in the manner of the propagation axis 1706 can be applied to any of the waveguide cores described herein.

Figure 19:
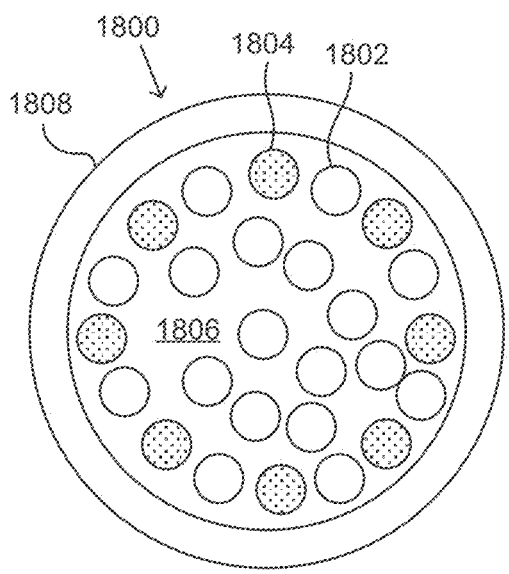
FIG. 19 is a cross-sectional view of a core rod preform.
Figure 20:
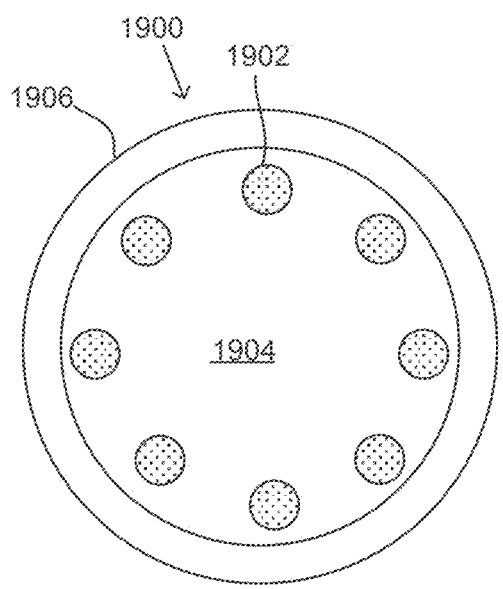
FIG. 20 is a cross-sectional view of another embodiment of a core rod preform.

FIG. 19 shows a representative embodiment of a core rod preform 1800 for the optical waveguide of FIG. 1. The core rod preform 1800 can include one or more first glass rods such as representative first glass rod 1802 having a first index of refraction n1 and one or more second glass rods such as representative second glass rod 1804 having a second index of refraction n2 arranged within a volume 1806 defined by the interior walls of a larger glass tube 1808. The first and second glass rods 1802, 1804 can be arranged such that when the core rod preform 1800 is collapsed (e.g., by heating) to form a core rod, the core rod can have a refractive index profile that varies angularly and/or radially about a propagation axis of the core rod. Alternatively, a core rod preform 1900 can comprise a plurality of first glass rods such as representative first glass rod 1902 arranged within a volume 1904 defined by the interior walls of a larger glass tube 1906, as shown in FIG. 20. The remainder of the volume 1904 can be filled or partially filled with grains of a glassy material, such as silica. The core rod preform 1900 can then be sintered to form a finished core rod. In alternative embodiments, volumes can be created in the core material by, for example, drilling of the core material, followed by insertion of a different material having a different index of refraction into the volumes to create the mode-discriminating regions. In embodiments where the mode-discriminating regions define volumes containing, for example, one or more gases, pressure control can be used to prevent collapse of the volumes during drawing of the waveguide preform.

Figure 21:
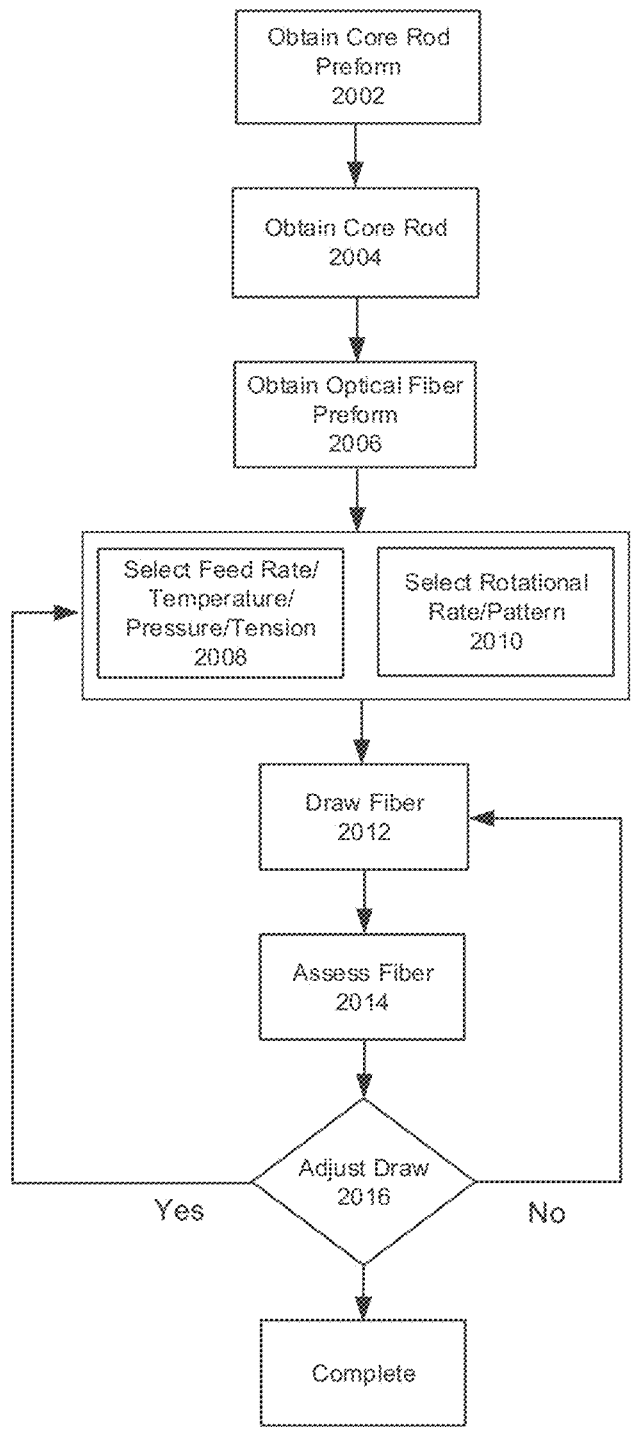
FIG. 21 is a schematic block diagram illustrating a representative embodiment of a method of making an optical waveguide.

FIG. 21 illustrates a schematic block diagram of a representative method of making an optical waveguide in the form of an optical fiber. At step 2002, a core rod preform can be obtained by arranging a plurality of glass rods of differing refractive indices within a larger glass tube, as described above. The plurality of glass rods can be arranged such that when sintered or melted together, the resulting core rod has a refractive index profile that varies angularly about a longitudinal axis of the core rod. Alternatively, the core rod preform can be obtained by arranging one or more glass tubes within a larger glass tube, by filling an interior volume of the larger glass tube with grains of a glassy material, or any combination thereof.

At 2004, a core rod can be obtained by collapsing the larger glass tube by heating with, for example, an $O_2$—$H_2$ flame. At step 2006, an optical fiber preform can be obtained by situating the core rod within one or more cladding and/or sleeving tubes. At 2008, drawing parameters such as feed rate, temperature, pressure, and tension can be selected. At 2010, angular refractive index profile variation parameters such as rotational rate and rotational pattern can be selected.

One or both of the rotational rate and the rotational pattern can be selected to be time-varying during the fiber drawing process such that the refractive index profile of the finished fiber can have different angular variations along a propagation axis of the fiber. At step 2012, the fiber is drawn and rotated according to the selected feed rate, rotational rate, and rotational pattern parameters. The drawn fiber can be assessed at 2014 based on fiber diameter, angular refractive index profile variation along the propagation axis of the fiber, radial refractive index profile variation along the propagation axis of the fiber, and periodicity of the angular and radial refractive index profile variations, in the case of periodic rotational patterns. At 2016, it can be determined that one or more of the drawing parameters and/or angular refractive index profile variation parameters is preferably adjusted, and parameters are reselected at 2008, 2010, as needed.

Figure 22:
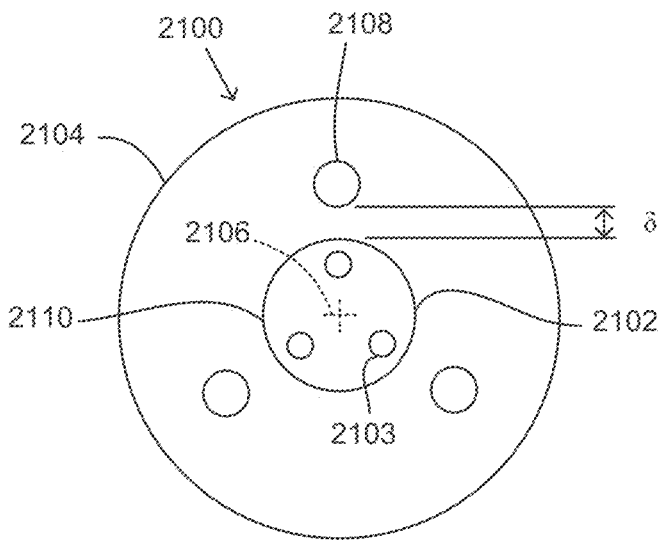
FIG. 22 is a cross-sectional view of another embodiment of an optical waveguide having one or more mode-discriminating regions located in the core and one or more mode-discriminating regions located in the cladding.

FIG. 22 shows an alternative embodiment of a waveguide 2100 having a core 2102 and a cladding 2104. The core 2102 can have a round cross-sectional shape, and can be configured to propagate optical radiation along a propagation axis 2106. The core 2102 can comprise one or more mode-discriminating regions such as representative mode-discriminating region 2103 arranged about the propagation axis 2106, similar to the embodiments described above. In this manner, the refractive index profile of the core 2102 can vary angularly and radially about the propagation axis 2106. The refractive index profile of the core 2102 can also vary along a length of the propagation axis 2106.

The cladding 2104 can also comprise one or more mode-discriminating regions such as representative mode-discriminating region 2108 situated about the core 2102. The one or more mode-discriminating regions such as mode-discriminating region 2108 can have a first index of refraction n1 that is different from a second index refraction n2 of the cladding 2104. In this manner, the refractive index profile of the cladding 2104 can vary angularly and radially about the propagation axis 2106 of the core 2102. In some embodiments, the first index of refraction n1 can be the same as the refractive index of the core 2102. In some embodiments, the refractive index profile of the cladding 2104 can also vary angularly along a length of the propagation axis 2106. Such angular variation along the propagation axis 2106 can be achieved by rotating the waveguide preform during the drawing process, as described above.

The one or more mode-discriminating regions such as mode-discriminating region 2108 can be situated a distance δ from an exterior boundary 2110 of the core 2102. In some embodiments, the distance δ can be equal to a multiple of the wavelength of optical radiation intended to propagate through the core 2102. For example, in some embodiments the distance δ can be about the same as the wavelength of optical radiation intended to propagate through the core 2102. In some embodiments, the distance δ can be from about two times the wavelength of optical radiation intended to propagate through the core 2102 to about ten times the wavelength of optical radiation intended to propagate through the core 2102. In alternative embodiments, the distance δ can be a fraction of the wavelength intended to propagate through the core 2102.

As optical radiation propagates through the waveguide 2100, a fundamental mode of the optical radiation can propagate through the core 2102 while higher order modes can be coupled into the cladding 2104 a distance approximately equal to the distance δ or a fraction of the distance δ. In this manner, one or more higher-order modes propagating through the waveguide 2100 can encounter the angularly varying refractive index profile of the cladding 2104 in addition to the angularly varying refractive index profile of the core 2102, which can discriminate against the propagation of the one or more higher-order modes. In this manner, the waveguide 2100 can be configured to propagate the fundamental mode while discriminating against unwanted higher order modes. The one or more mode-discriminating regions such as mode-discriminating region 2108 can have any suitable shape and can be arranged in any suitable arrangement about the core 2102. In some embodiments, the one or more mode-discriminating regions such as representative mode-discriminating region 2103 of the core 2102 and the one or more mode-discriminating regions such as representative mode-discriminating region 2108 of the cladding 2104 can be symmetrically arranged with respect to one another, as shown in FIG. 22, or asymmetrically arranged, as desired.

Figure 23:
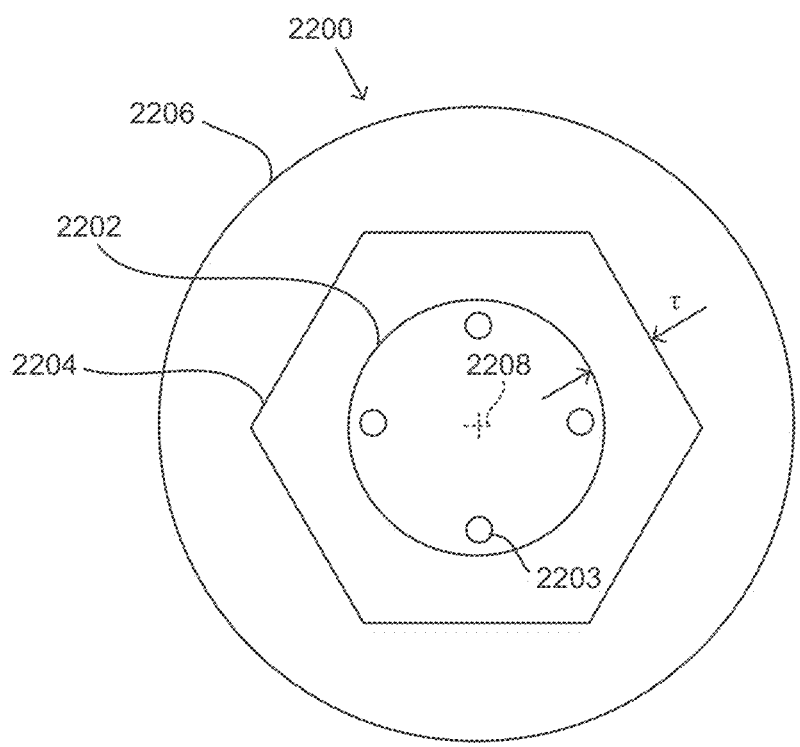
FIG. 23 is a cross-sectional view of another embodiment of an optical waveguide including one or more mode-discriminating regions located in the core and having a polygonally-shaped inner cladding.

Referring to FIG. 23, there is shown another alternative embodiment of an optical waveguide 2200 having a core 2202, an inner cladding 2204, and an outer cladding 2206. The core 2202 can have a round cross-sectional shape, and can be configured to propagate optical radiation along a propagation axis 2208. The core 2202 can comprise one or more mode-discriminating regions, such as representative mode-discriminating region 2203, arranged about the propagation axis 2208, similar to the embodiments described above. In this manner, the refractive index profile of the core 2202 can vary angularly and radially about the propagation axis 2208. The refractive index profile of the core 2202 can also vary along a length of the propagation axis 2208.

The inner cladding 2204 can have a non-circular cross-section, such as the hexagonal cross-section shown in FIG. 23, and can have a first index of refraction n1 that is different from a second index refraction n2 of the core 2202. In this manner, the refractive index profile of the inner cladding 2204 can vary angularly and radially about the propagation axis 2208 of the core 2202. In some embodiments, the refractive index profile of the cladding 2204 can also vary angularly along a length of the propagation axis 2208. Such angular variation along the propagation axis 2208 can be achieved by rotating the waveguide preform during the drawing process, as described above.

The inner cladding 2204 can have a thickness π, which can vary angularly and radially about the propagation axis 2208 of the core 2202 in accordance with the cross-sectional shape of the inner cladding 2204. In some embodiments, the thickness π can be equal to a multiple of the wavelength of optical radiation intended to propagate through the core 2202. For example, in some embodiments the thickness π can be about the same as the wavelength of light intended to propagate through the core 2202. In some embodiments, the thickness π can be from about two times the wavelength of optical radiation intended to propagate through the core 2202 to about ten times the wavelength of optical radiation intended to propagate through the core 2202. In alternative embodiments, the thickness π can be a fraction of the wavelength intended to propagate through the core 2202.

As optical radiation propagates along the waveguide 2200, a fundamental mode of the optical radiation can propagate through the core 2202 while one or more higher order modes can be coupled into the inner cladding 2204 a distance approximately equal to the thickness π or a fraction of the thickness π. In this manner, the one or more higher-order modes can encounter the angularly-varying refractive index profile of the inner cladding 2204 in addition to the angularly-varying refractive index profile of the core 2202, which can discriminate against the propagation of the one or more higher-order modes. In this manner, the waveguide 2200 can be configured to propagate the fundamental mode while discriminating against unwanted higher order modes. In alternative embodiments, the waveguide 2200 can have any suitable cross-sectional shape and can be fabricated by, for example, sleeving the rounded core 2202 with inner cladding material, and then machining the inner cladding material to the desired cross-sectional shape and thickness π.

Figure 24:
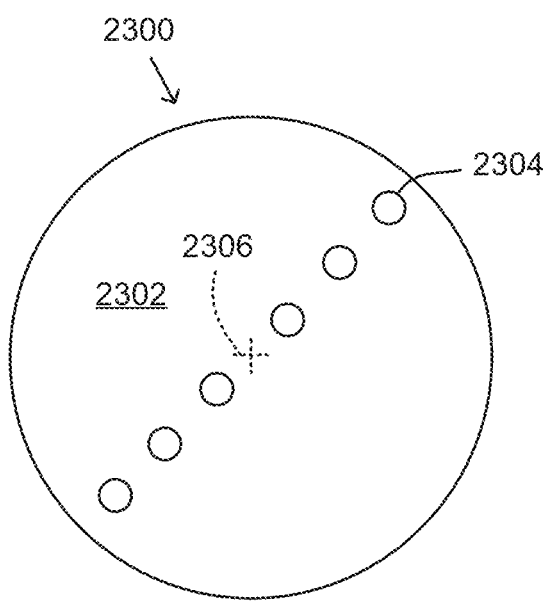
FIG. 24 is a cross-sectional view of another embodiment of a waveguide core having one or more mode-discriminating regions located at uniformly increasing radial distances from a propagation axis of the core.

Referring now to FIG. 24, another embodiment of an optical waveguide core 2300 can have a mode-propagating region 2302 and one or more mode-discriminating regions such as representative mode-discriminating region 2304 arranged about a propagation axis 2306. The one or more mode-discriminating regions such as mode-discriminating region 2304 can be located at uniformly increasing radial distances from the propagation axis 2306, and can be arranged in an angularly symmetric manner. For example, in the embodiment shown, the one or more mode-discriminating regions such as mode-discriminating region 2304 can be aligned along an axis passing through the center of the core 2300. In this manner, the refractive index profile of the core 2300 can vary angularly and radially about the propagation axis 2306. In alternative embodiments, the radial distance between the one or more mode-discriminating regions 2304 need not be uniform, and the one or more mode-discriminating regions can be arranged in an angularly symmetric or asymmetric manner, as desired.

The following examples are provided to illustrate certain features of working embodiments. A person of ordinary skill in the art will appreciate that the scope of the present invention is not limited to the scope of the features exemplified by these examples.

EXAMPLE 1

Figure 25:
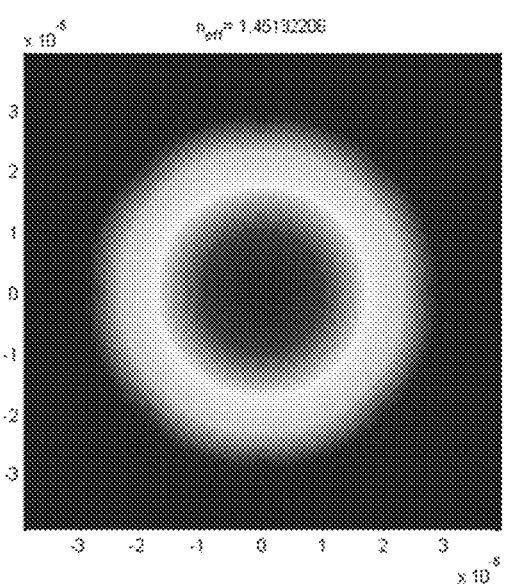
FIG. 25 illustrates the $LP_{01}$ mode field distribution for the waveguide core of FIG. 1 at a wavelength of 1060 nm.
Figure 26:
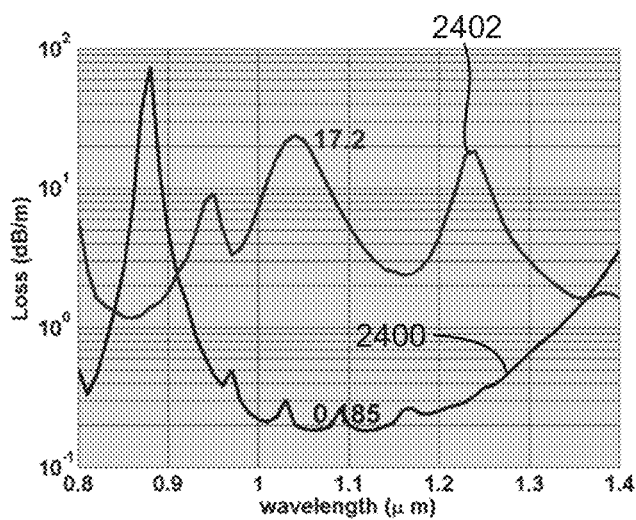
FIG. 26 is a plot of the transmission loss versus wavelength for the $LP_{01}$ and $LP_{11}$ modes for light wavelengths between 800 nm and 1400 nm transmitted through the core of the optical waveguide of FIG. 1.

In a first working example, an optical waveguide is modeled having a round core including a mode-propagating region and eight mode-discriminating regions arranged about a propagation axis of the waveguide, similar to the embodiment of FIG. 1. The mode-propagating region of the core has a step index profile, and is Ge-doped. The core has a numerical aperture of 0.07, and a diameter of approximately 60 μm. The mode-discriminating regions are made of pure silica, and have uniform diameters of approximately 2 μm. The waveguide is drawn with a rotational period of about 5 mm. The $LP_{01}$ mode field distribution for light transmitted through the waveguide having a wavelength of 1060 nm is shown in FIG. 25. The waveguide exhibits a transmission loss of about 20 dB/m for the $LP_{11}$ mode, while the fundamental mode $LP_{01}$ exhibits a relatively low transmission loss of less than 0.2 dB/m. An output beam of the optical waveguide can be characterized by high gain and single mode propagation. Corresponding mode field diameters of the output beam can exceed 50 μm, increasing the nonlinear effect threshold by about 5-fold compared to conventional large mode area fibers, which typically reach a maximum mode field diameter of about 22 μm. A plot of the transmission loss versus wavelength for the $LP_{01}$ mode 2400 and the $LP_{11}$ mode 2402 for light wavelengths between 800 nm and 1400 nm is shown in FIG. 26.

EXAMPLE 2

Figure 27:
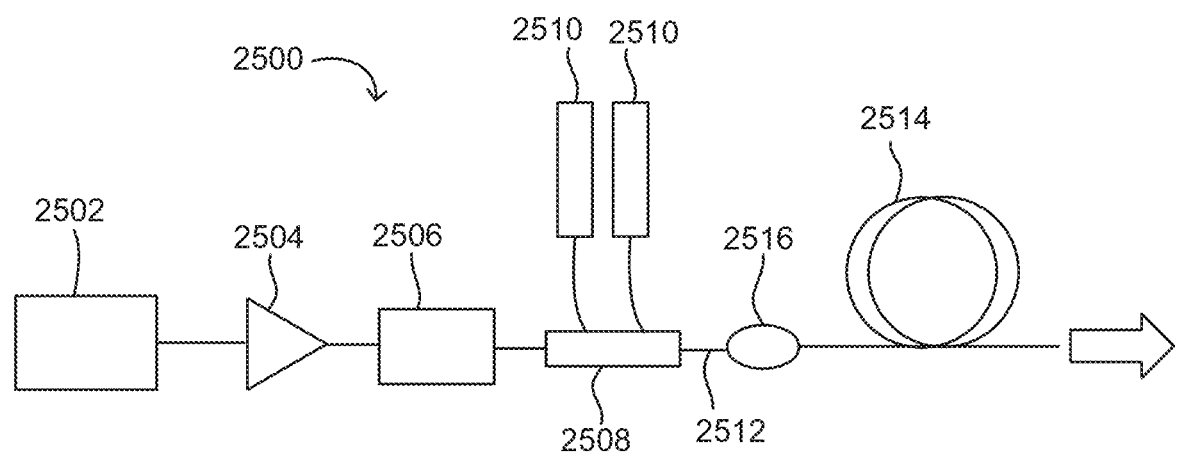
FIG. 27 is a schematic illustration of a representative embodiment of an optical system including an optical waveguide.

The disclosed optical waveguides can be useful for many optical systems, including fiber laser and fiber amplifier systems. FIG. 27 shows an optical system 2500 comprising a pulsed seed source laser 2502 in communication with one or more pre-amplifiers or pre-amplification stages 2504. The seed source 2502 can be configured to provide relatively low power laser pulses at a predetermined pulse width and repetition rate. For example, one suitable pulse width may be 100 ps and a suitable repetition rate may be 10 MHz. The system 2500 can comprise one or more optical isolators 2506 configured to reduce feedback between components of the system 2500. The system 2500 can further comprise a pump combiner 2508 configured to couple pump light from one or more pump radiation sources, such as pump laser diodes 2510, into the cladding of a passive optical fiber 2512. The pump combiner 2508 can also couple the signal light from the seed source 2502 into the core of the passive fiber 2512.

The passive fiber 2512 can be in communication with an active fiber 2514 configured in accordance with any of the embodiments described above via a splice 2516. Pump light can enter the core of the active fiber 2514, which can thereby amplify the signal light of the seed source 2502. The active fiber 2514 can be configured to propagate the $LP_{01}$ mode with relatively low transmission loss (e.g., losses of approximately 0.2 dB/m for an operating wavelength of 1060 nm) and to attenuate higher order modes (e.g., losses of approximately 20 dB/m for an operating wavelength of 1060 nm). In embodiments where an interface between the passive fiber and the active fiber (i.e., the splice 2516) may excite multiple modes due to mode field mismatch and large core size, higher order modes can be attenuated in the active fiber 2514.

EXAMPLE 3

Figure 28:
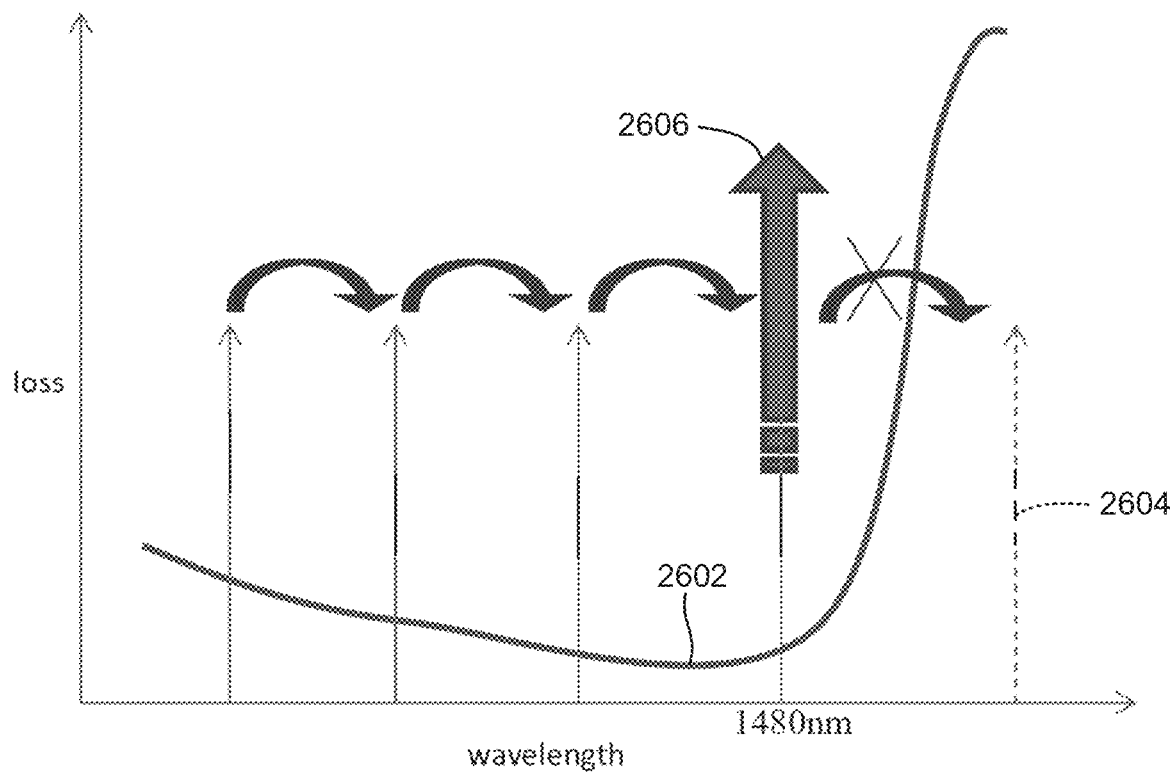
FIG. 28 is a plot of transmission loss versus wavelength for a cascaded Raman amplifier including an optical waveguide.

In a third working example, the optical waveguide of the present application can be useful for cascaded Raman amplifiers. A plot of transmission loss, represented by line 2602, versus wavelength for a representative cascaded Raman amplifier incorporating the optical waveguide of the present application is shown in FIG. 28. The optical waveguide can be configured such that amplifier has relatively low transmission loss for wavelengths between, for example, 1100 to 1480 nm, and high transmission loss for wavelengths above 1480 nm. The relatively higher transmission loss at wavelengths above 1480 nm can be associated with an enhanced cutoff effect at 1480 nm. The enhanced cutoff effect can suppress the generation of cascaded stokes 2604 above 1480 nm, and enhance output at 1480 nm, represented by arrow 2606.

EXAMPLE 4

In a fourth working example, the optical waveguide of the present application can be useful for amplified spontaneous emission (ASE) filters. An Yb-doped waveguide can be designed to have low transmission loss at a desired laser signal wavelength, such as 1064 nm, and high transmission loss at an ASE band of, for example, 1020 nm-1050 nm. Such a waveguide can act as an ASE filter, which can reduce ASE buildup or increase the ASE threshold, thereby suppressing ASE noise in fiber laser or amplifier applications and enhancing laser performance and enabling further power scaling. Such a waveguide can also be used for suppressing 1 μm ASE or spurious lasing in Er—Yb-codoped fibers and for suppressing the 1 μm ASE or spurious lasing in Yb-doped fiber lasers and amplifiers operating at 976 nm.

In view of the many possible embodiments to which the principles of this disclosure may be applied, it should be recognized that the illustrated embodiments are only pre-

What is claimed is:

1. An optical waveguide, comprising:
    a core that extends along a propagation axis, the core comprising a mode-propagating region and a plurality of mode-discriminating regions, the mode-propagating region comprising a material having a first index of refraction, the plurality of mode-discriminating regions comprising a second material having a second index of refraction that is different from the first index of refraction, the core comprising a round outer boundary; and
    a cladding disposed about the round outer boundary of the core and extending along the propagation axis;
    wherein the mode-propagating region comprises a non-circular cross-section circumscribed within the round outer boundary of the core; and
    wherein the mode-discriminating regions are defined by the round outer boundary of the core and the non-circular cross-section of the mode-propagating region such that the mode-discriminating regions are enclosed by the material of the mode-propagating region of the core and the cladding; and
    wherein a refractive index profile of the core is configured to attenuate one or more higher order modes.

2. The optical waveguide of claim 1, wherein the mode-propagating region has a polygonally-shaped cross-section comprising a plurality of facets circumscribed within the round outer boundary of the core, adjacent facets of the plurality of facets intersecting each other to define vertices.

3. The optical waveguide of claim 2, wherein the mode-discriminating regions are defined by areas bounded by the round outer boundary of the core, a facet of the mode-propagating region, and vertices on opposite sides of the respective facet.

4. The optical waveguide of claim 2, wherein the mode-propagating region has a hexagonally-shaped cross-section.

5. The optical waveguide of claim 2, wherein the mode-propagating region has an octagonally-shaped cross-section.

6. The optical waveguide of claim 1, wherein an edge of at least a portion of the cross-section of the mode-propagating region is defined by a plurality of curves of different radii.

7. The optical waveguide of claim 6, wherein:
    a mode-discriminating region disposed in an area between the cladding and the edge of the mode-propagating region that is defined by the plurality of curves comprises an inner edge portion and an outer edge portion;
    the inner edge portion of the mode-discriminating region is defined by the plurality of curves of different radii; and
    the outer edge portion of the mode-discriminating region is round, and comprises a portion of the outer boundary of the core.

8. The optical waveguide of claim 1, wherein a refractive index profile of the core varies angularly along a length of the propagation axis.

9. The optical waveguide of claim 8, wherein the refractive index profile of the core is periodic along the propagation axis.

10. The optical waveguide of claim 8, wherein the refractive index profile of the core is aperiodic along the propagation axis.

11. The optical waveguide of claim 8, wherein the refractive index profile of the core is configured to attenuate an $LP_{11}$ mode.

12. A method of discriminating against a higher order mode, comprising:
    directing optical radiation into the core of the optical waveguide of claim 1; and
    receiving the optical radiation after propagation in the optical waveguide.

13. The method of claim 12, wherein the higher order mode is an $LP_{11}$ mode.

14. An optical system, comprising:
    a seed optical source configured to provide a seed optical beam;
    one or more optical amplifiers configured to receive and amplify the seed optical beam;
    at least one optical pump source configured to provide at least one pump optical beam to a combiner, the combiner being configured to couple pump optical radiation from the pump optical beam into a cladding of a passive optical fiber; and
    the optical waveguide of claim 1 configured as an active optical fiber in communication with the passive optical fiber, and configured to discriminate against higher order modes.

15. The optical waveguide of claim 1, wherein the entire core is solid.

16. The optical waveguide of claim 1, wherein the plurality of mode-discriminating regions are angularly separated and discontinuous around a cross-section of the optical waveguide.

17. The optical waveguide of claim 1, wherein the mode-discriminating regions comprise round radially-outward surfaces at the round outer boundary of the core.

18. A method, comprising:
    machining a silica rod such that the silica rod has a non-circular cross-section, the silica rod having a first index of refraction;
    situating the machined silica rod in a silica tube comprising a second index of refraction different from the first index of refraction; and
    collapsing the silica tube to form a core rod preform;
    situating the core rod preform in a cladding tube to obtain an optical waveguide preform; and
    drawing the optical waveguide preform to obtain an optical waveguide comprising a core that extends along a propagation axis, the core comprising a mode-propagating region and a plurality of mode-discriminating regions, the mode-propagating region comprising the first index of refraction, the plurality of mode-discriminating regions comprising the second index of refraction, the core comprising a round outer boundary, the optical waveguide comprising a cladding disposed about the round outer boundary of the core and extending along the propagation axis, wherein the non-circular cross-section of the mode-propagating region is circumscribed within the round outer boundary of the core, and the mode-discriminating regions are defined by the round outer boundary of the core and the non-circular cross-section of the mode-propagating region such that the mode-discriminating regions are enclosed by the silica material of the mode-propagating region of the core and the cladding, the core having a refractive index profile configured to attenuate one or more higher order modes.

19. The method of claim 18, further comprising rotating the optical waveguide while it is being drawn such that a refractive index profile of the core varies angularly along the propagation axis.

20. The method of claim 19, further comprising rotating the optical waveguide periodically or aperiodically while it is being drawn.

21. An optical waveguide, comprising:
- a core that extends along a propagation axis, the core comprising a mode-propagating region and a plurality of mode-discriminating regions, the mode-propagating region comprising a material having a first index of refraction, the plurality of mode-discriminating regions comprising a second material having a second index of refraction that is different from the first index of refraction, the core comprising a round outer boundary; and
- a cladding disposed about the round outer boundary of the core and extending along the propagation axis;
- wherein the mode-propagating region comprises a polygonally-shaped cross-section comprising a plurality of facets circumscribed within the round outer boundary of the core, adjacent facets of the plurality of facets intersecting each other to define vertices; and
- wherein the mode-discriminating regions are defined by areas bounded by the outer boundary of the core, a facet of the mode-propagating region, and vertices on opposite sides of the respective facet such that the mode-discriminating regions are enclosed by the material of the mode-propagating region of the core and the cladding.

* * * * *